United States Patent
Oguchi et al.

US007660324B2

(10) Patent No.: US 7,660,324 B2
(45) Date of Patent: Feb. 9, 2010

(54) VIRTUAL NETWORK CONSTRUCTION METHOD, SYSTEM, AND RELAYING APPARATUS

(75) Inventors: Naoki Oguchi, Kawasaki (JP); Yuji Saito, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 461 days.

(21) Appl. No.: 09/988,958

(22) Filed: Nov. 19, 2001

(65) Prior Publication Data
US 2002/0067725 A1 Jun. 6, 2002

(30) Foreign Application Priority Data
Dec. 6, 2000 (JP) .............................. 2000-371913

(51) Int. Cl.
*H04J 3/26* (2006.01)
(52) U.S. Cl. .................. 370/432; 370/229; 370/230; 370/352; 370/401; 370/410
(58) Field of Classification Search ................. 370/229, 370/230, 352, 389, 392, 401, 410
See application file for complete search history.

(56) References Cited

U.S. PATENT DOCUMENTS

| | | | | |
|---|---|---|---|---|
| 6,181,697 | B1 * | 1/2001 | Nurenberg et al. | 370/390 |
| 6,259,701 | B1 * | 7/2001 | Shur et al. | 370/401 |
| 6,438,612 | B1 * | 8/2002 | Ylonen et al. | 709/249 |
| 6,526,056 | B1 * | 2/2003 | Rekhter et al. | 370/392 |
| 6,587,467 | B1 * | 7/2003 | Morgenstern et al. | 370/399 |
| 6,611,872 | B1 * | 8/2003 | McCanne | 709/238 |
| 6,614,781 | B1 * | 9/2003 | Elliott et al. | 370/352 |
| 6,640,251 | B1 * | 10/2003 | Wiget et al. | 709/238 |
| 6,674,756 | B1 * | 1/2004 | Rao et al. | 370/395.21 |
| 6,711,153 | B1 * | 3/2004 | Hebb et al. | 370/351 |
| 6,751,218 | B1 * | 6/2004 | Hagirahim et al. | 370/390 |
| 6,751,220 | B1 * | 6/2004 | Li | 370/390 |
| 6,771,673 | B1 * | 8/2004 | Baum et al. | 370/535 |
| 6,778,494 | B1 * | 8/2004 | Mauger | 370/230 |
| 6,778,531 | B1 * | 8/2004 | Kodialam et al. | 370/390 |
| 6,779,051 | B1 * | 8/2004 | Basil et al. | 710/33 |
| 6,788,681 | B1 * | 9/2004 | Hurren et al. | 370/389 |
| 6,850,987 | B1 * | 2/2005 | McCanne et al. | 709/238 |
| 6,856,676 | B1 * | 2/2005 | Pirot et al. | 379/201.01 |
| 6,870,842 | B1 * | 3/2005 | Caronni et al. | 370/390 |
| 6,917,614 | B1 * | 7/2005 | Laubach et al. | 370/392 |
| 6,937,574 | B1 * | 8/2005 | Delaney et al. | 370/254 |
| 6,973,057 | B1 * | 12/2005 | Forslow | 370/328 |

(Continued)

FOREIGN PATENT DOCUMENTS

GB      EP-00300111.2    *    1/2000

(Continued)

*Primary Examiner*—Ayaz R Sheikh
*Assistant Examiner*—Andrew C Lee
(74) *Attorney, Agent, or Firm*—Katten Muchin Rosenman LLP

(57) ABSTRACT

In a virtual network construction method, a virtual network construction system, and a relaying apparatus within a public data communication network, control packets each having set a multicast address are multicast, and upon reception of the control packets by the relaying apparatuses belonging to the multicast address group, virtual links to the transmitting sources of the control packets are established and reply packets are returned through the virtual links, whereby the virtual links are established between all of the relaying apparatuses belonging to the multicast address group to establish the virtual network.

9 Claims, 15 Drawing Sheets

U.S. PATENT DOCUMENTS 6,977,929 B1 * 12/2005 Caronni et al. ............... 370/392
6,980,515 B1 * 12/2005 Schunk et al. ............ 370/230.1
7,039,687 B1 * 5/2006 Jamieson et al. ............ 709/220
7,116,679 B1 * 10/2006 Ghahremani ................ 370/463
7,120,118 B2 * 10/2006 Rajagopal et al. ........... 370/237
2003/0076854 A1 * 4/2003 Mudhar et al. .............. 370/432

FOREIGN PATENT DOCUMENTS

JP           8034472      3/1996
WO           92/12587     7/1992
WO           WO 92/12587  7/1992

* cited by examiner

FIG.4

| INTERFACE NAME | IP ADDRESS |
|---|---|
| UR1-PP1 | private2.10.2 |
| UR2-PP1 | private1.20.2 |
| UR3-PP1 | private2.30.2 |
| UR5-PP1 | private2.50.2 |
| UR6-PP1 | private1.30.2 |

FIG.6A  EDGE ROUTER PR 1

| VPN-ID | VIRTUAL ROUTER |
|---|---|
| 1 | VPN1-VR1 |
| 2 | VPN2-VR1 |

FIG.6B  EDGE ROUTER PR 4

| VPN-ID | VIRTUAL ROUTER |
|---|---|
| 1 | VPN1-VR2 |
| 2 | VPN2-VR2 |

| VPN-ID | MULTICAST ADDRESS |
|---|---|
| 1 | 239.192.0.1 |
| 2 | 239.192.0.2 |
| ... | ... |
| 1024 | 239.192.4.0 |

FIG.9

| MESSAGE TYPE | 0 |
|---|---|
| VPN-ID | 1 |
| SRC IP ADDRESS | private1.100.1 |
| TUNNEL TYPE | 0(L2TP) |
| TUNNEL ID | 0 |
| SESSION ID | 0 |
| PASSWORD | 11111 |

FIG.10A  UPWARD TUNNEL (PR4→PR1)

| TUNNEL ID | 105 |
|---|---|
| SESSION ID | 200 |

FIG.10B  DOWNWARD TUNNEL (PR1→PR4)

| TUNNEL ID | 300 |
|---|---|
| SESSION ID | 202 |

FIG.11

| MESSAGE TYPE | 1 |
|---|---|
| VPN-ID | 1 |
| SRC IP ADDRESS | private1.100.2 |
| TUNNEL TYPE | 0(L2TP) |
| TUNNEL ID | 105 |
| SESSION ID | 200 |
| PASSWORD | 11111 |

FIG.14

| DESTINATION | NEXT HOP | OUTPUT PORT |
|---|---|---|
| global1.0/24 | Direct | PR1-PP6 |
| global2.0/24 | global1.2 | PR1-PP6 |
| global3.0/24 | global1.2 | PR1-PP6 |
| global4.0/24 | global1.2 | PR1-PP6 |

FIG.15

| DESTINATION | NEXT HOP | OUTPUT VIRTUAL INTERFACE |
|---|---|---|
| private1.6.0/24 | private1.100.3 | V1-VR1-VP5 |
| private1.5.0/24 | private1.100.2 | V1-VR1-VP6 |
| private1.2.0/24 | private1.20.2 | V1-VR1-VP2 |

FIG.16

| PHYSICAL INTERFACE | VPN-ID | VIRTUAL ROUTER | VIRTUAL INTERFACE |
|---|---|---|---|
| PR1-PP1 | 2 | VPN2-VR1 | V2-VR1-VP1 |
| PR1-PP2 | 1 | VPN1-VR1 | V1-VR1-VP2 |

FIG.17

| VIRTUAL INTERFACE | OWN ADDRESS | CONNECTING DESTINATION ADDRESS | ENCAP-SULATION | OUTPUT PORT |
|---|---|---|---|---|
| V1-VR1-VP2 | private1.2.1 | private1.20.11 | NO | PR1-PP2 |
| V1-VR1-VP5 | private1.10.1 | private1.100.3 | YES | -- |
| V1-VR1-VP6 | private1.11.1 | private1.100.2 | YES | -- |

FIG.18

| PRIVATE ADDRESS | GLOBAL ADDRESS |
|---|---|
| private1.100.2 | global3.2 |
| private2.100.2 | global3.2 |
| private1.100.3 | global4.2 |

FIG.19

| CONNECTING DESTINATION VIRTUAL ROUTER ADDRESS | TRANSMITTING TUNNEL ID | TRANSMITTING SESSION ID |
|---|---|---|
| private1.100.2 | 300 | 202 |
| private1.100.3 | 301 | 243 |
| private2.100.2 | 1001 | 1201 |

FIG.20

| RECEIVING TUNNEL ID | RECEIVING SESSION ID | RECEIVING VIRTUAL ROUTER | VIRTUAL INTERFACE |
|---|---|---|---|
| 105 | 200 | VPN1-VR1 | V1-VR1-VP6 |
| 106 | 201 | VPN1-VR1 | V1-VR1-VP5 |
| 1102 | 1301 | VPN2-VR1 | V2-VR1-VP6 |

VIRTUAL NETWORK CONSTRUCTION METHOD, SYSTEM, AND RELAYING APPARATUS

BACKGROUND OF THE INVENTION

1. Field of the Invention

The present invention relates to a virtual network construction method, a virtual network construction system, and a relaying apparatus, and in particular to a virtual network construction method, a virtual network construction system, and a relaying apparatus within a public data communication network.

2. Description of the Related Art

Companies, enterprises, or the like having their sites which are referred to as user sites dispersed over a plurality of locations, have adopted various methods as inter-LAN connecting technology for connecting local area networks (LAN's) of the sites to construct intra-company networks or the like.

One of such methods is a leased line service connecting the user sites with leased lines, for example. However, since the leased line service is very expensive and its billing is proportional to the distance, the user company constructs the inter-LAN connection by connecting each site in line in order to economize the distance of the lines utilized as much as possible.

In this case, there has been a problem that when the communication is disabled at an intermediating user site due to a fault, the end to end communication is also disabled.

Thereafter, a virtual leased line service such as an ATM (Asynchronous Transfer Mode) service and an FR (Frame Relay) service which is less expensive compared to the leased line service appeared, so that the billing is performed in accordance with the number of virtual connections instead of the billing proportional to the distance.

As a result, network configuration connecting the LAN's of branch offices to a headquarter in the form of a star has increased and it has decreased that a fault at an intermediating site gives influences on the other sites.

Moreover, the spread of the Internet has enabled user companies to connect the dispersed user sites by using the Internet, which is a public data communication network, without using the virtual leased line service such as the ATM service and the FR service. Such a service is called an Internet VPN service, and the billing is performed by the number of physical sites connected. It is to be noted that VPN stands for Virtual Private Network.

Since the LAN of each user site (hereinafter, referred to as user network) generally uses private addresses in an Internet VPN service, packets cannot be flown unchanged into the Internet using global addresses.

Therefore, for the communications through the Internet (hereinafter, referred to as global Internet) between a plurality of user network sites, a so-called tunneling technique is required.

Namely, when transmitting a packet from the user network to the global Internet, a router connecting to the global Internet in the user network of the transmitting source encapsulates the packet to be transmitted from the user network with an IP packet having a global address and transmits it to a destination user network through the global Internet.

A router connecting to the global network in the destination user network decapsulates the packet after receiving it and then forwards it to a destination host computer within the destination user network.

In this case, each user network is required to be provided with a router connecting to the global network that is an apparatus capable of initiating and terminating a tunnel, i.e. encapsulating and decapsulating the packet. However, when processes become complicated the performance of that router declines, so that purchase of an expensive apparatus or upgrade is required in order to improve the performance.

Moreover, if there are numerous sites, various settings, such as routing information setting and logical interfaces setting, necessary for the connection to the global Internet become more complicated. In this case, the user company is required to educate managers for maintaining and managing the VPN, so that additional staffs and costs are required.

Consequently, a new VPN service has been devised in which the maintenance and management of the VPN are outsourced to a provider (Internet Service Provider; hereinafter abbreviated as ISP) or a carrier of the public data communication network so that the existing routers can be used in the user network without changes. Hereinafter, such a VPN service will be referred to as an IP-VPN (Internet Protocol-Virtual Private Network) service.

In the IP-VPN service, the tunnel initiating/terminating function is provided by a relaying apparatus within the public data communication network. Hereinafter, the relaying apparatus within the public data communication network having the tunnel initiating/terminating function will be occasionally referred to as an edge router. Moreover, in case there are a plurality of user sites and the user networks of the sites are connected to different routers, a routing control between the user networks is required wherein the edge router determines, for a packet transmitted from a user network, to which tunnel an encapsulated packet should be transmitted according to the destination user network. Such a routing control function is also provided by the edge router.

Namely, the edge router transfers the packet based on routing information of a private address of the user network, aside from the routing information of the global Internet.

In order to describe a general IP-VPN service, FIG. 21 shows that virtual networks (hereinafter, referred to as private networks) constructed by tunnels connecting the user networks are overlaid to the global Internet operated by using global addresses, when the user networks are operated by using private addresses.

In FIG. 21, an ISP network NW1 providing a global address space has its backbone composed of edge routers PR1, PR4, and PR5, and core routers PR2 and PR3 which do not accommodate the user networks nor provide the tunnel initiating/terminating function within the public data communication network.

Now, a case will be considered where a user company desires to mutually connect user networks UN1-UN6 by using the IP-VPN service.

In this case, the user networks UN1-UN6 have existing routers (user routers) UR1-UR6 respectively, wherein the user routers UR1 and UR2 are connected to the edge router PR1, the user routers UR3-UR5 are connected to the edge router PR4, and the UR6 is connected to the edge router PR5, respectively.

In the edge routers PR1, PR4, and PR5, there are virtual routers VPN1-VR1-VPN1-VR3. Therefore, the user networks UN1-UN6 are connected to a virtual private network VPN1 which is a private address space through the virtual routers VPN1-VR1-VPN1-VR3 as shown extracted above the network NW1 in FIG. 21.

Conventionally proposed methods of such an IP-VPN service will be specifically described below.

(1) IETF RFC2547

Firstly, a method proposed as an IETF RFC2547 will be described referring to FIG. 22.

FIG. 22 shows the same physical connection form as that of FIG. 21. However, in FIG. 22, different from FIG. 21, it is assumed that a user company (company A) having sites of the user networks UN1, UN3, and UN4 is different from a user company (company B) having sites of the user networks UN2, UN5, and UN6.

Therefore, in FIG. 22, a virtual private network VPN2 for the company A and a virtual private network VPN1 for the company B are separately constructed.

Also in FIG. 22, ports are shown as physical interfaces of the edge routers PR1, PR4, and PR5, e.g. ports PR1-PP1, PR1-PP2, and PR1-PP6 are shown in the edge router PR1.

Also, ports as virtual interfaces of virtual routers VPN1-VR1, VPN1-VR2, VPN1-VR3, VPN2-VR1, and VPN2-VR2 are shown, e.g. ports V2-VR1-VP1 and V2-VR1-VP6 are shown in the virtual router VPN2-VR1.

Hereinafter, the process of the IETF RFC2547 method will be described.

When the companies A and B respectively perform communications between their user networks, it is required that the packets are transferred through the ISP network NW1 in the virtual private networks VPN2 and VPN1 respectively.

The RFC2547 method realizes the VPN using a technique called a Multi Protocol Label Switching (MPLS) and a routing protocol called a Border Gateway Protocol.

The MPLS is a technique which enables a router on an IP route to replace an IP packet relaying process performed on a network layer with a label switching process performed on a datalink layer by using a label added to the packet, thereby reducing a process of route retrieval and relaying a packet at a high speed.

The label of MPLS assumes a value predetermined for an inter-router link between the routers sharing the links, so that upon receiving a packet with label, the router checks the label to determine where it should be relayed to, and adds a new label corresponding to the output link to the packet to be retransmitted.

A path in which the packet is transferred by the label is called a Label Switching Path (LSP). The LSP can be regarded as a tunnel in which the IP packet is encapsulated to be transferred by the label. Hereinafter, the LSP will be occasionally referred to as an MPLS tunnel.

Also, in the RFC2547 method, the routing protocol called the Border Gateway Protocol (hereinafter abbreviated as BGP) is used. In the edge routers, a routing control process realizing this protocol is activated, so that the routing control processes on the edge routers are connected in a full mesh. Alternatively, the edge routers can be connected starlike, so that they are connected through a route reflector providing an exchange function of a routing control packet similar to that provided in case of the full mesh connection.

In order to exchange the routing control packets by the MPLS tunnels between the edge routers connected in the full mesh, the LSP's are required to be pre-established so that the edge routers are connected in the full mesh. The LSP's established herein are realized by setting, in the routers, labels corresponding to inter-router links on routes for global IP prefixes of destination network. Such LSP's will be hereinafter referred to as level-1 tunnels. In the arrangement of FIG. 22, the level-1 tunnels are established between physical routers PR1-PR4, PR1-PR5, and PR4-PR5.

An administrator of ISP makes a port (I/F) number of the edge router correspond to a Route Distinguisher (hereinafter abbreviated as RD) as a user site identifier. In this case, the RD can be an arbitrary number which is unique for each user network managed by the provider network.

Also, there is another mapping between the VPN's and groups of RD's, that sets which user networks, distinguished by the RD's belong to the same VPN. By this mapping, e.g. the VPN2 and VPN1 are respectively made to correspond to the ports PR1-PP1 and PR1-PP2 of the edge router PR1. In the edge router, the VPN's are distinguished by VPN numbers, and the VPN numbers are used for managing the routing table independently per VPN, and for making user network accommodating ports correspond to the VPN.

Also, the administrator of ISP makes one-to-one correspondences between the port numbers and the virtual interfaces of the virtual routers for each port of the edge routers connected to the user networks.

By making such correspondences, e.g. the virtual interfaces V2-VR1-VP1 and V1-VR1-VP2 are respectively made to correspond to the ports PR1-PP1 and PR1-PP2 of the edge router PR1.

It is to be noted that the edge routers PR1, PR4, and PR5 have independent routing tables per VPN. These routing tables are generated by the routing control process (BGP) common to the VPN's and independently generated per virtual private network based on the routing information within all of the virtual private networks (VPN1 and VPN2 in case of FIG. 22) received from the local sites or remote sites.

At this time, the routing control process on the edge router assigns an RD to an address prefix of the received routing information from the user networks, so that the routing information can be distinguished per virtual private network.

Also, the edge routers have a function of searching through the routing table corresponding to the VPN by the port number of the port having received the data packet and of forwarding the packet received. This forwarding function has a virtual interface for transmitting the packet to the tunnel established between the edge routers.

The edge routers have different MPLS tunnels (level-2 tunnels) per destination prefix within the same VPN, so that different tunnels per destination can be identified.

The edge routers multiplex the tunnels for each prefix (level-2 tunnels), nested within the level-1 tunnel, between the edge routers. Actually, the edge routers doubly add the MPLS labels corresponding to the level-1 tunnel and the level-2 tunnel to the IP packet.

This can be seen in FIG. 22, where three level-2 tunnels are established in the level-1 tunnel between the edge routers PR1 and PR4. Namely, the three level-2 tunnels are the two tunnels between the virtual port V2-VR1-VP6 of the virtual router VPN2-VR1 and the virtual port V2-VR2-VP1 of the virtual router VPN2-VR2 established per address prefix, a single tunnel established between the virtual port V1-VR1-VP6 of the virtual router VPN1-VR1 and the virtual port V1-VR2-VP1 of the virtual router VPN1-VR2.

In the routing tables per VPN on the edge routers, a representing address of a next hop edge router and a virtual interface for transmission thereto for each destination prefix are written. The virtual interface is an entrance to the level-2 tunnel connected to the destination edge router.

In FIG. 22, the virtual interface V2-VR1-VP6 of the virtual router VPN2-VR1 within the edge router PR1 is the entrance to the level-2 tunnel connected to the destination edge router PR4.

The edge router assigns a different label for a level-2 tunnel per prefix, and adds a label for a level-1 tunnel determined by the representing address of the next hop edge router to transmit the packet to the physical port (PP) connected to the global Internet.

As to routing control process, the routing control process on each edge router generates independent routing tables per VPN by exchanging routing information both of the global Internet and of the VPN's through the level-1 tunnel established between the routers.

In the forwarding process, when the packet arrives at the physical port of the edge router from the user site, the edge router refers to the routing table corresponding to the VPN by the VPN number corresponding to the physical port which has received the packet and transmits the packet to the virtual interface connected to the next hop edge router.

When the virtual router transmits the packet to the virtual interface, practically, after the edge router adds a label (hereinafter, referred to as level-2 label) corresponding to the level-2 tunnel per prefix, the edge router adds a label (hereinafter, referred to as level-1 label) corresponding to the level-1 tunnel to the edge router on which the destination virtual router exists, and transmits the packet to the physical interface.

Also, when the edge router receives a packet with a label from the ISP network NW1, the next hop router and the output physical port are determined by the label, using a label table where a relaying operation is described. For example, in an MPLS implemented system by the Cisco Systems, Inc., in the United States, the level-1 label is removed at an LSR (label switching router) which is prior to the edge router by one hop, so that the edge router receives the packet with the level-2 label. The edge router checks the level-2 label, searches through the label table, and forwards the packet to the physical port connected to the user site. At this time, the level-2 label is removed from the packet to be forwarded.

(2) IETF draft draft-muthukrishnan-corevpn-arch-00.txt

Next, a method proposed as an IETF draft draft-muthukrishnan-corevpn-arch-00.txt will be described referring to FIG. 23.

The arrangement of FIG. 23 is almost the same as that of FIG. 22. However, it is different in that there are two tunnels in the virtual private network VPN2 shown in FIG. 22, between the virtual interface V2-VR1-VP6 of the virtual router VPN2-VR1 and the virtual interface V2-VR2-VP1 of the virtual router VPN2-VR2, whereas only one tunnel is shown in FIG. 23.

This is because in this method, management per destination prefix is not performed.

Also, since the routing protocol between the virtual routers is not limited to the BGP in this method, tunnels are not always required to be established in the full mesh between the edge routers. However, establishing the tunnels in the full mesh is preferable considering that the end-to-end communication will be disturbed if a fault occurs in an edge router, and that the number of router hops of the relayed packet will be increased by relaying a number of edge routers.

In this case, the MPLS is used as the tunneling technique, and the administrator of ISP establishes the MPLS tunnel (level-1 tunnel) between every pair of edge routers in the same way as in the case of FIG. 22.

Also, different from FIG. 22, the edge router activates an independent virtual router per VPN, so that the same VPN-ID is set in the virtual routers belonging to the same VPN. The virtual routing function has the routing function for receiving the routing information within the user network and generating the routing table based on the received information, and the forwarding function for forwarding the received packet by searching through the routing table corresponding to the VPN-ID by the received port number. This forwarding function has the virtual interface for transmitting the packet to the tunnel established between the edge routers.

Also, the virtual routers on the edge routers having the same VPN-ID are connected with the virtual link on the global network. However, in order to make distinction from the traffics from the user sites having other VPN-ID's, the virtual routers having other VPN-ID's use different virtual links (tunnels) per VPN (level-2 tunnel).

The edge router multiplexes the inter-virtual router links (level-2 tunnels) of the VPN's being nested within the level-1 tunnel between the edge routers. Practically, the edge router doubly adds the MPLS labels corresponding to the level-1 tunnel and the level-2 tunnel to the IP packet to be transmitted.

In order to determine which virtual router of the edge router is connected to the end of which level-2 tunnel, the virtual router on the edge router makes the label value of the level-2 tunnel correspond to a virtual I/F address of the destination virtual router which is the connecting destination of the tunnel in case an IP address is allocated to the virtual I/F or to the representative address of the destination virtual router in case of a point-to-point link wherein the IP address is not allocated to the virtual I/F.

Also, the administrator of ISP makes one-to-one correspondences between the virtual interfaces of the virtual routers and the port numbers of the ports connected to the user site.

The virtual routers having the same VPN-ID exchange the routing information of each other through the level-2 tunnel established between the edge routers, and then generate routing tables for that VPN-ID.

When the packet arrives at the physical port of the edge router from the user site, the edge router refers to the routing table corresponding to the VPN-ID by the VPN-ID corresponding to the physical port having received the packet and transmits the packet to the virtual interface connected to the next hop virtual router.

When the virtual router transmits the packet to the virtual interface, practically, after the edge router adds a label corresponding to the level-2 tunnel, the edge router adds the label corresponding to the level-1 tunnel to another edge router on which the destination virtual router exists, and transmits the packet to the physical interface.

When the edge router receives the packet with the label from the level-1 tunnel, the edge router checks the level-1 label of the encapsulated packet, determines whether the packet is addressed to itself to remove the label, or the packet should be forwarded by changing the label. If it is addressed to itself, the edge router checks the label corresponding to the level-2 tunnel and determines which virtual interface of the virtual router within the edge router should receive the packet. At this time, the edge router removes the level-2 label to pass the packet to the virtual interface.

The virtual router having received the packet at the virtual interface checks the destination address in an IP header of the IP packet, that is the destination address within the user network, forwards the packet to one of the virtual interfaces corresponding to the virtual ports connected to the user site by searching through the VPN routing table held by the virtual router.

It is to be noted that in the above-mentioned methods (1) and (2), the MPLS tunneling is used as the tunneling technique. In this case, the packet relayed by the MPLS tunnel has a format as shown in FIG. 24 wherein SHIM headers are doubly added.

However, an L2TP (layer two tunneling protocol) tunnel and an IPsec (IP security protocol) tunnel are generally used as the IP tunnel which is a tunneling technique other than the MPLS tunnel.

A packet of the general L2TP tunnel has a format shown in FIG. 25. When the packet consisting of the IP header, a TCP/UDP header, and application data is transmitted through an L2TP tunnel, an L2TP header and a PPP header are added thereto associated with an encapsulation. Moreover, when the edge router transmits the encapsulated packet to the provider network, a lower layer media PPP/Ether header, and the like as well as the IP header and the UDP header are also added.

Also, in the general IPsec tunnel, there are cases where an AH (authentication header) having the authenticating function and where an ESP (encapsulating security payload) header having both functions of authentication and encryption. The formats of the respective packets relayed in the IPsec tunnel are shown in FIGS. 26 and 27.

As shown in FIG. 26, in the packet using the AH header, an outer IPv4 header, the AH header, an inner IPv4 header, and IP upper layer data are objects of the authentication.

Also, as shown in FIG. 27, the packet using the ESP header is composed of the outer IPv4 header, the ESP header, the inner IPv4 header, the IP upper layer data, an ESP trailer, and an ESP authentication header. The range excluding the outer IPv4 header and the ESP authentication header therefrom is the object of the authentication. Moreover, the range further excluding the ESP header therefrom is the object of the encryption.

In order to provide the IP-VPN service, the administrator of ISP allocates the VPN numbers or the VPN-ID's to the ports of the edge routers connected to the user networks. In order to enable the communication between the sites belonging to the same VPN, it is required that the sites are mutually connected by the tunnels through the global network and that the communication should be distinguished from the communication between the sites having other VPN numbers or VPN-ID's.

In the IETF RFC2547 method, the edge routers are required to hold the relationship between the ports and the virtual private networks to which the ports belong, and to mutually connect the ports within the same virtual private network with the virtual links (level-2 tunnels).

In the RFC2547 method, the BGP session for connecting the BGP routing control process on the edge router is established by using the level-1 tunnel connecting the edge routers. The edge router multiplexes the routing information of all of the VPN's by using the BGP session to be exchanged. The edge router determines, based on the routing information, which ports accommodating the user sites should be connected with the layer 2 tunnel.

The edge router distributing the routing information by using the BGP protocol sets which routing information of which site belonging to which VPN should be distributed to which virtual router. Also, for the edge router having received the routing information by the BGP protocol, the administrator of ISP manually sets in the edge router that, in which virtual router the route received by the BGP should be stored. Therefore, if the configuration of the VPN becomes complicated and the number of the VPN's increases, the setting becomes extremely complicated.

Generally, the BGP is the routing protocol mainly used by providers which is transit networks. There are not a few providers who realize the routing control by an OSPF (open shortest path first). Therefore, operating the BGP on all of the edge routers of the providers in order to realize the VPN has been a big hurdle.

On the other hand, in the method of draft-mushukrishnan-corevpn-arch-00.txt, the virtual routers belonging to the same VPN (having the same VPN-ID) are connected with the level-2 tunnels, so that the routing information received from a site belonging to a certain VPN is exchanged between the virtual routers using the level-2 tunnels which connect the virtual routers belonging to the VPN.

This method has been proposed based on the MPLS, and uses the Label Distribution Protocol (LDP) for establishing a Label Switching Path (LSP) which is the MPLS tunnel within the MPLS network, so that it cannot be applied to methods using the IP tunnel (L2TP,IPsec).

SUMMARY OF THE INVENTION

It is accordingly an object of the present invention, in a virtual network construction method, a virtual network construction system, and a relaying apparatus within a public data communication network, to find virtual routers on edge routers belonging to the same VPN, so that the virtual routers belonging to the same VPN can be mutually connected with tunnels (such as the L2TP tunnel or the IPsec tunnel) other than the LSP as well, in case routing information is exchanged between the virtual routers belonging to the same VPN as described in the draft-mushukrishnan-corevpn-arch-00.txt in order to realize the VPN without requiring complicated settings for controlling the routing information per VPN as in the RFC2547 method.

For the achievement of the above object, the virtual network construction method according to the present invention comprises steps of: generating and multicasting control packets each having set a multicast address predetermined per virtual network in first relaying apparatuses originating a virtual network within a public data communication network, and establishing virtual links to the first relaying apparatuses which are transmitting sources of the control packets upon receipt thereof and returning reply packets through the virtual links in second relaying apparatuses belonging to the multicast address group, whereby the virtual links are established between all pairs of the first and the second relaying apparatuses belonging to the multicast address group to construct the virtual network.

Namely, the first relaying apparatuses terminating the virtual communication network firstly generate the control packets each having set a multicast address predetermined per virtual network to be multicast to the address. Then, the second relaying apparatuses belonging to the multicast address group establish virtual links to the first relaying apparatuses which are the transmitting sources of the control packets triggered by receipt thereof, and return reply packets through the virtual links.

The first relaying apparatuses which are the transmitting sources of the control packets having received the returned reply packets are able to know between which relaying apparatuses the virtual links are established.

If such operations are performed by the first and the second relaying apparatuses, the virtual links are established between all of the first and the second relaying apparatuses belonging to the multicast address group, thereby enabling the construction of the virtual network.

Therefore, the relaying apparatuses terminating the virtual network within the public data communication network have only to hold the relationship between the virtual network and the multicast address, so that the management is simplified compared to the conventional RFC2547 method where the relationship between the ports and the virtual networks to which the ports belong is held to connect the ports belonging to the same virtual network with the virtual links.

Also, various conventional tunneling techniques can be used for the establishment of the virtual link, so that the tunneling technique is not limited to the MPLS tunneling technique as in the prior art.

In this case, the second relaying apparatuses may authenticate the control packets received.

Therefore, it becomes possible to avoid a problem which may be caused in association with the multicast control packet being received by someone not permitted to receive it.

The virtual links established by the virtual network construction method according to the present invention may comprise IP tunnels or MPLS tunnels.

Also, the virtual network construction system according to the present invention comprises: first relaying apparatuses for generating and multicasting, when starting a construction of a virtual network within a public data communication network, control packets each having set a multicast address predetermined per virtual network, and second relaying apparatuses for establishing virtual links to the first relaying apparatuses which are transmitting sources of the control packets upon receipt thereof and for returning reply packets through the virtual links, whereby the virtual links are established between all of the first and the second relaying apparatuses belonging to the multicast address group by operations thereof to construct the virtual network.

Namely, in the virtual network construction method according to the present invention, when starting a construction of a virtual network within a public data communication network, the first relaying apparatuses generate and multicast the control packets each having set a multicast address predetermined per virtual network.

The second relaying apparatuses having received the control packets are triggered by the reception thereof to establish the virtual links to the first relaying apparatuses which are transmitting sources of the control packets upon receipt thereof, and return the reply packets through the virtual link.

The first relaying apparatuses which are the transmitting sources of the control packets having received the returned reply packets are able to know between which relaying apparatuses the virtual links are established.

If such operations are performed by the first and the second relaying apparatuses, the virtual links are established between all of the first and the second relaying apparatuses belonging to the multicast address group, thereby enabling the construction of the virtual network.

Therefore, in this virtual network construction system, as in the virtual network construction method, the management is simplified compared to the conventional RFC2547 method and the tunneling technique is not limited to the MPLS tunneling technique.

In this case, the second relaying apparatuses establishing the virtual links may authenticate the control packets received.

Therefore, it becomes possible to avoid a problem which may be caused in association with the multicast control packet being received by someone not permitted to receive it.

The virtual links established by the virtual network construction system according to the present invention may comprise IP tunnels or MPLS tunnels.

Also, the relaying apparatus according to the present invention, which terminates a virtual network within a public data communication network comprises: means for generating and multicasting control packets each having set a multicast address predetermined per virtual network, and means for establishing virtual links to other relaying apparatuses which are transmitting sources of the control packets upon receipt thereof and for returning reply packets through the virtual links, whereby the virtual links are established between all of the relaying apparatuses belonging to the multicast address group to construct the virtual network.

Namely the relaying apparatus according to the present invention generates and multicasts the control packets each having set a multicast address predetermined per virtual network, establishes virtual links to the other relaying apparatuses which are the transmitting sources of the control packets upon receipt thereof, and returns the reply packets through the virtual links.

The relaying apparatuses which are the transmitting sources of the control packets having received the reply packets are able to know with which relaying apparatuses the virtual links are established.

When the relaying apparatuses terminating the virtual network within the public data communication network thus operate, the virtual links are established between all of the relaying apparatuses belonging to the multicast address, so that the virtual network can be constructed.

Therefore, by using this relaying apparatus, when constructing a virtual network within a public data communication network, the management is simplified compared to the conventional RFC2547 method and the tunneling technique is not limited to that of the MPLS tunnel.

Also, the relaying apparatus according to the present invention may further comprise means for authenticating the control packets received.

By using such means, it becomes possible to avoid a problem which may be caused in association with the multicast control packet being received by someone not permitted to receive it.

Moreover, the relaying apparatus according to the present invention may further comprise means for generating a routing table for each of a plurality of virtual networks logically independent of one another, and means for performing a packet relay of each private network based on the routing table.

Namely, routing tables are generated for a plurality of logically independent virtual networks, so that the packet relay of each virtual network is performed based on the routing information. Therefore, the packet relay in this case is performed by each virtual network logically independent of one another.

Thus, a logically independent packet relay in each virtual network is enabled without causing confusions between different virtual networks.

The virtual links established by the relaying apparatus according to the present invention may comprise IP tunnels or MPLS tunnels.

BRIEF DESCRIPTION OF THE DRAWINGS

FIG. 4 is a diagram showing an embodiment of IP addresses allocated to interfaces of user routers shown in FIG. 1;

FIGS. 6A and 6B are diagrams showing embodiments of VPN-ID—virtual router correspondence tables according to the present invention;

FIG. 9 is a diagram showing an embodiment of all field values of the tunnel initiation message shown in FIG. 8;

FIGS. 10A and 10B are diagrams showing setting examples of tunnel ID's and session ID's according to the present invention;

FIG. 11 is a diagram showing an embodiment of field values of a reply message according to the present invention;

FIG. 14 is a diagram showing an embodiment of a global Internet routing table according to the present invention;

FIG. 15 is a diagram showing an embodiment of a virtual router routing table according to the present intention;

FIG. 16 is a diagram showing an embodiment of a correspondence table of interface which accommodates user network to virtual router according to the present invention;

FIG. 17 is a diagram showing an embodiment of a virtual interface management table according to the present invention;

FIG. 18 is a diagram showing an embodiment of a private address resolution table according to the present invention;

FIG. 19 is a diagram showing an embodiment of a VPN multiplexing table according to the present invention;

FIG. 20 is a diagram showing an embodiment of a VPN demultiplexing table according to the present invention;

Throughout the figures, like reference numerals indicate like or corresponding components.

DESCRIPTION OF THE EMBODIMENTS

Figure 23:
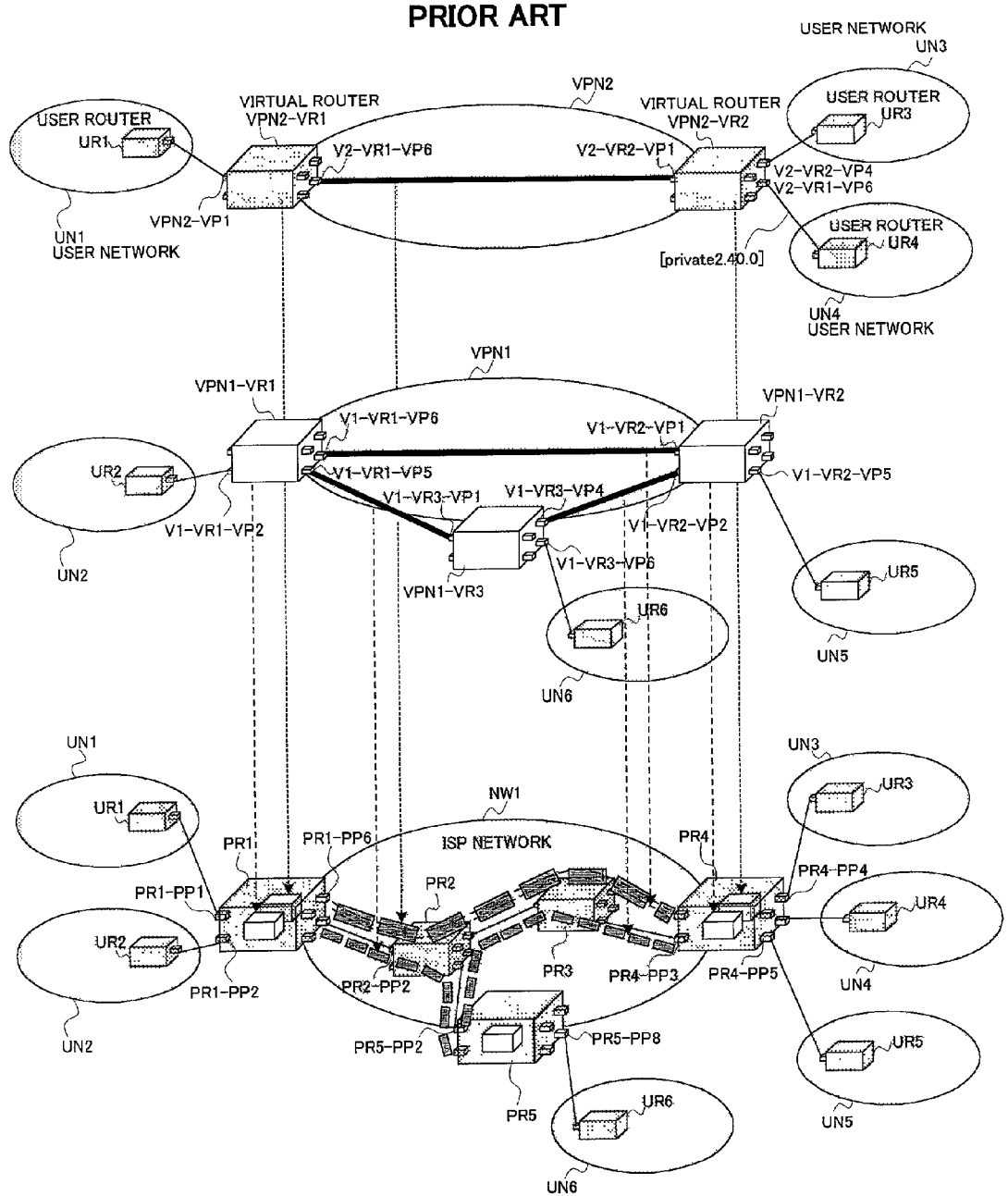
FIG. 23 is a network diagram showing a prior art VPN arrangement (2)
Figure 24:
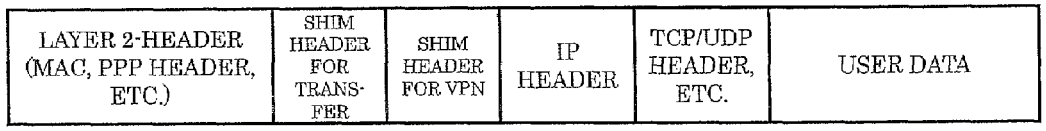
FIG. 24 is a diagram showing a packet format within an MPLS tunnel in the prior art VPN arrangements (1) and (2)

An embodiment of the present invention will be described referring to FIG. 1. This embodiment has the same arrangement as that of FIG. 23, except that a host having an IP address [private1.2.23] is connected to a user network UN2, and a server having an IP address [private1.5.25] is connected to a user network UN5.

Also, in order to describe specifically, physical ports, virtual interfaces, networks, and tunnels have their corresponding IP addresses indicated by square brackets [ ].

Interfaces beginning with "lo0" are called loop back interfaces, and are not connected to any of the physical/logical links. Addresses of these interfaces are often used as ones representing the routers.

It is to be noted that an IP address in IPv4 is denoted as a four-byte integer delimited per byte such as "168.254.192.0". However, the IP address is denoted by substituting the upper two bytes or three bytes with a character string such as "private1" or "global" in the present embodiment.

Also, as an address notation, an IP address ending with "/24" indicates that there are 24 masking bits, and is mainly used to indicate a bit length of a network IP address within the IP address.

Figure 1:
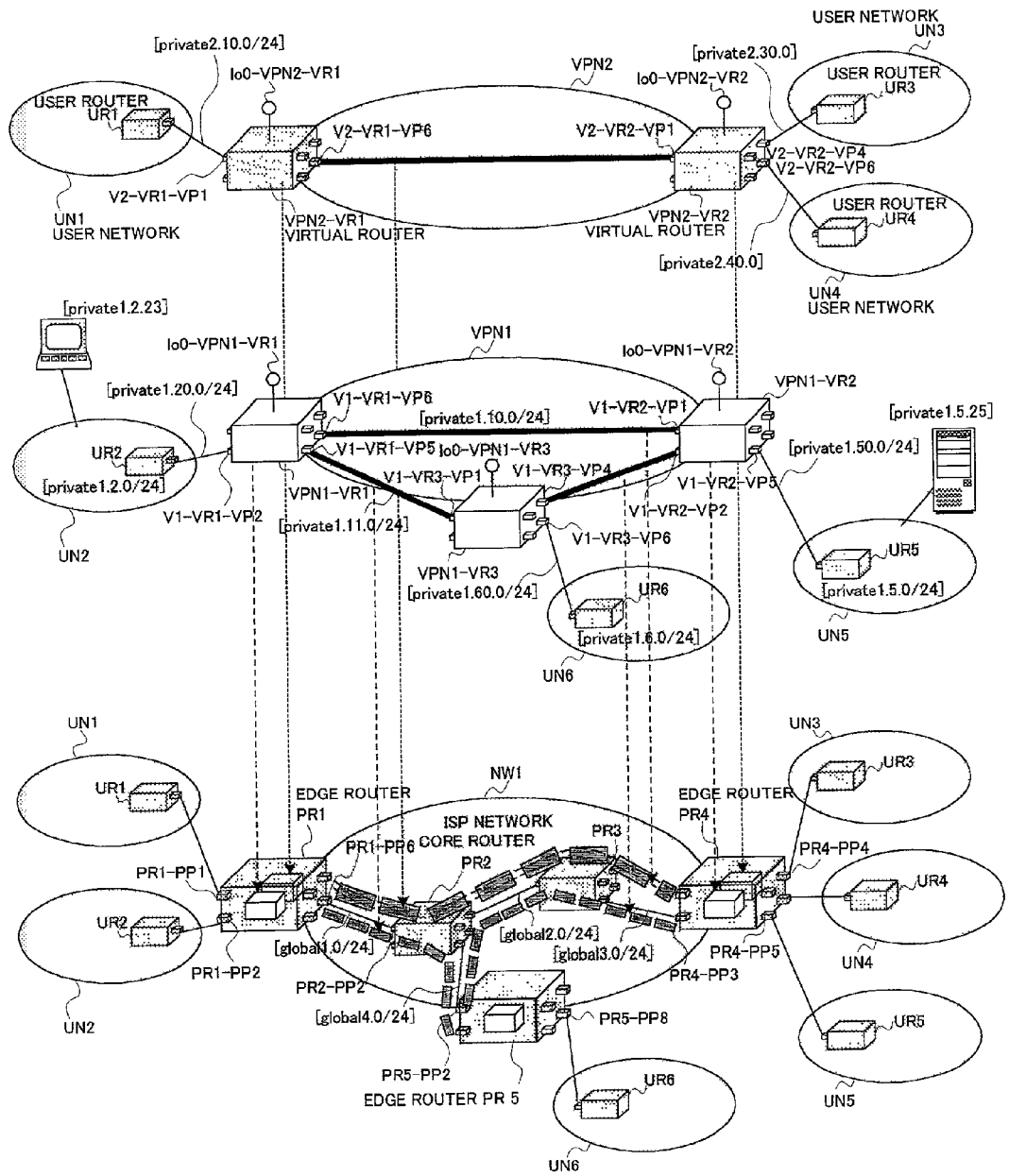
FIG. 1 is a network diagram for illustrating an embodiment of the present invention.
Figure 2:
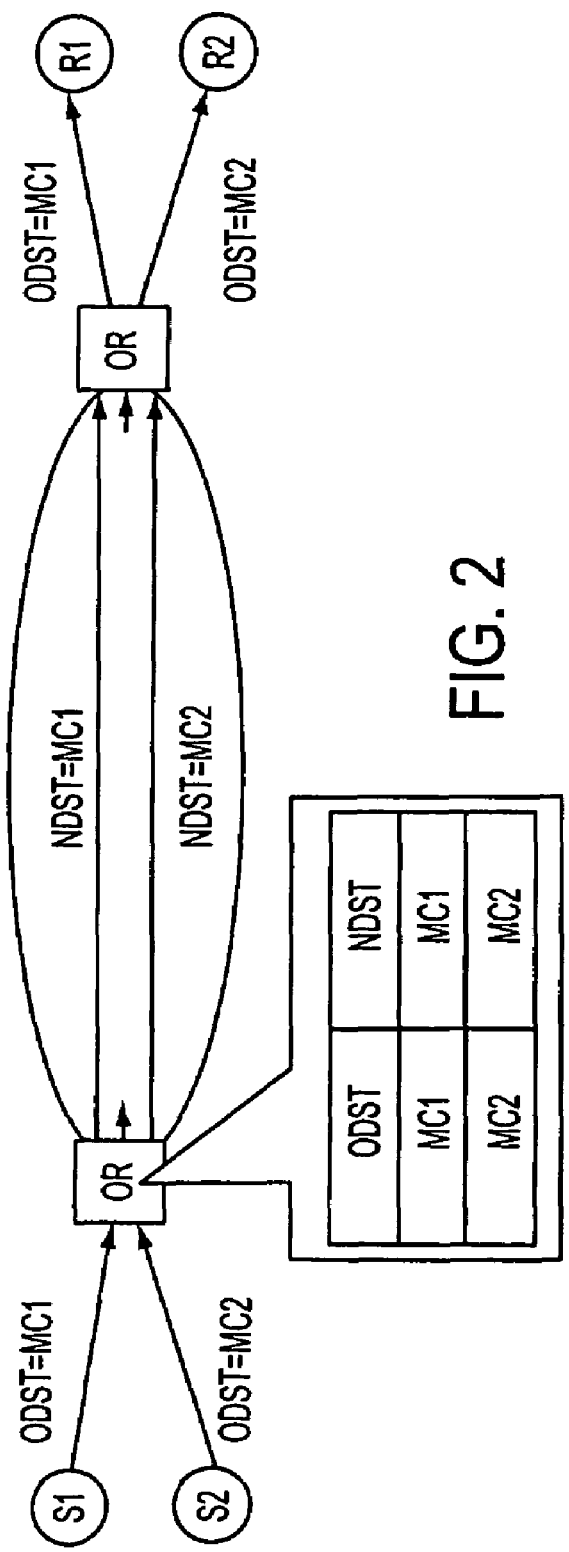
FIG. 2 is a diagram showing an embodiment of IP addresses allocated to virtual interfaces shown in FIG. 1.

It is to be noted that FIG. 2 shows IP addresses assigned to virtual interfaces of virtual routers within the VPN1 shown in FIG. 1. For example, an IP address [private1.20.1] is made to correspond to a virtual interface V1-VR1-VP2.

Figure 3:
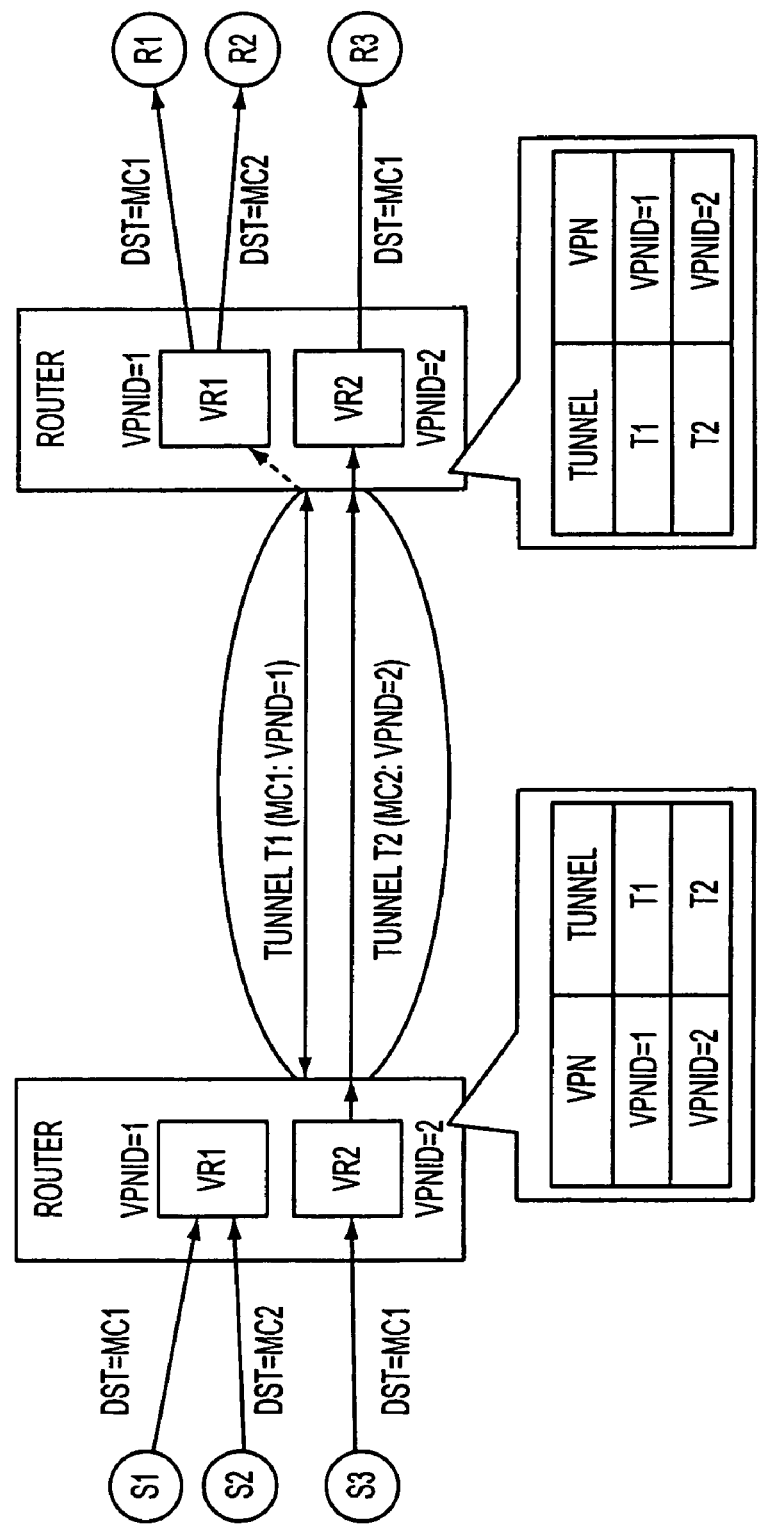
FIG. 3 is a diagram showing an embodiment of IP addresses allocated to interfaces of edge routers shown in FIG. 1.

Also, FIG. 3 shows IP addresses assigned to interfaces of the edge routers PR1, PR4, and PR5 shown in FIG. 1. For example, an IP address [private2.10.1] is made to correspond to the interface PR1-PP1.

Moreover, FIG. 4 shows IP addresses assigned to interfaces of the user routers UR1-UR6 shown in FIG. 1. For example, an IP address [private2.10.2] is made to correspond to the UR1-PP1.

Firstly, a virtual network construction procedures will be described taking the procedures of the edge routers PR1 and PR4 as an example.

Figure 5:
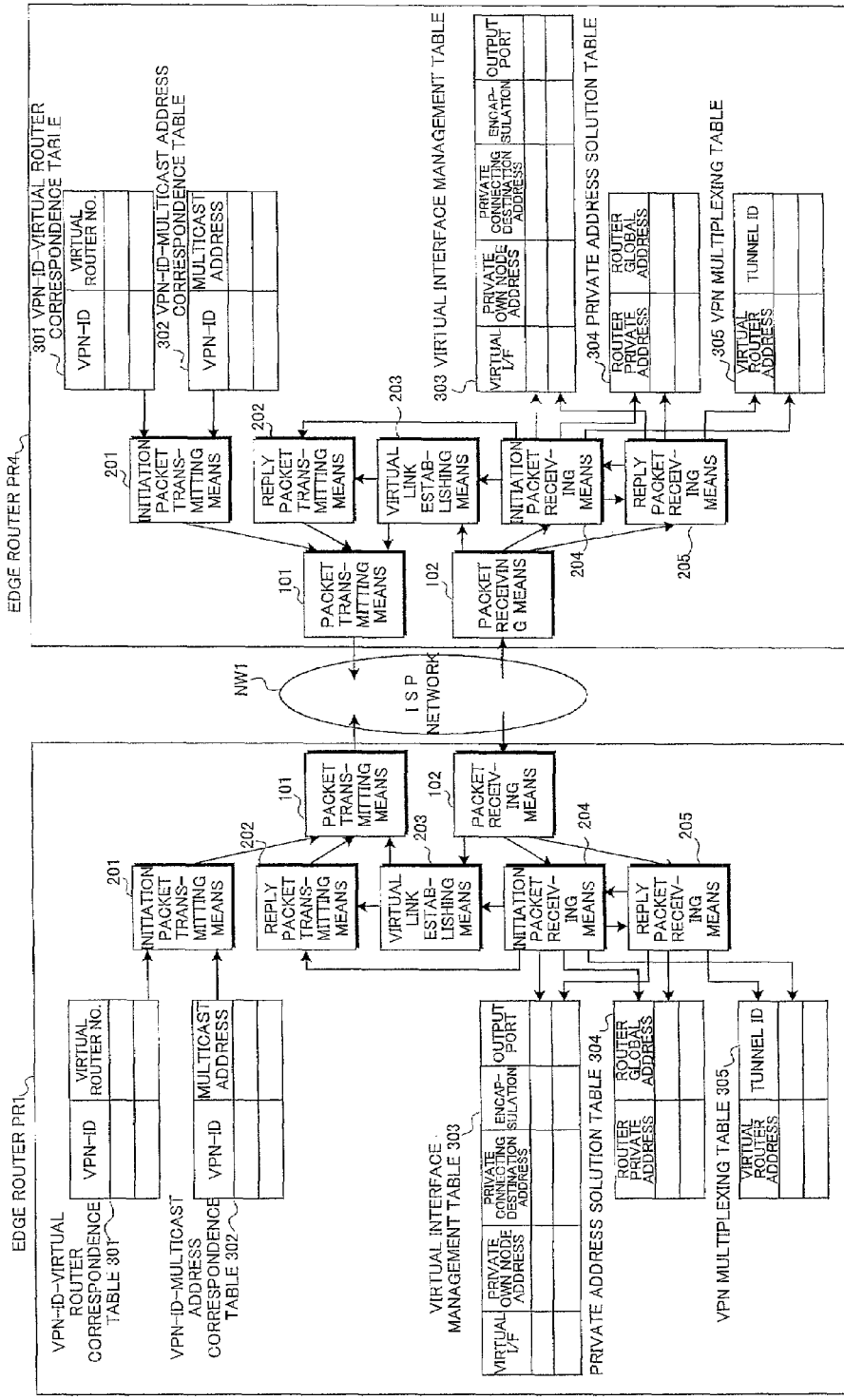
FIG. 5 is a block diagram for illustrating operations of the edge routers shown in FIG. 1.

FIG. 5 shows internal arrangements of the edge routers PR1 and PR4 within the ISP network NW1 shown in FIG. 1. However, for the sake of description, the edge routers PR1 and PR4 are shown outside of the ISP network NW1.

Both of the edge routers PR1 and PR4 have the same arrangement, and have packet transmitting means 101, packet receiving means 102, initiation packet transmitting means 201, reply packet transmitting means 202, virtual link establishing means 203, initiation packet receiving means 204, and reply packet receiving means 205.

Moreover, both of the edge routers also have same tables, which include a VPN-ID—virtual router correspondence table 301, a VPN-ID—multicast address correspondence table 302, a virtual interface management table 303, a private address resolution table 304, and a VPN multiplexing table 305.

It is to be noted that VPN-ID's per VPN and corresponding multicast addresses thereof are predetermined to be common within the network NW1 by an administrator of ISP.

Assuming that the VPN-ID's of VPN1 and VPN2 shown in FIG. 1 are respectively "1" and "2", the VPN-ID—virtual router correspondence table 301 within the edge router PR1 shown in FIG. 5 is set as shown in FIG. 6A, so that e.g. VPN1-VR1 is made to correspond to VPN-ID=1. Similarly, FIG. 6B shows an example of the VPN-ID—virtual router correspondence table 301 within the edge router PR4.

Figures 7, 8:
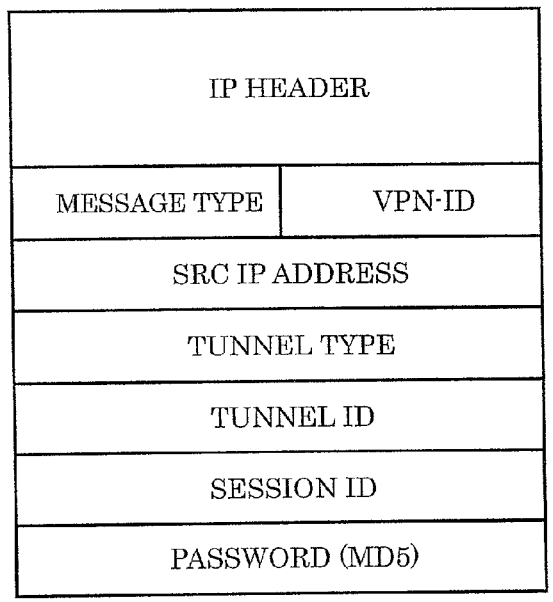
FIG. 7 is a diagram showing an embodiment of a VPN-ID—multicast address correspondence table according to the present invention.
FIG. 8 is a diagram showing a packet format of a tunnel initiation message according to the present invention.

Also, since the VPN-ID—multicast address correspondence table 302 is common within the network NW1, the edge routers PR1 and PR4 have the same contents. FIG. 7 shows an example of the VPN-ID—multicast address correspondence table 302, wherein a multicast address [239.192.0.1] is set to correspond to VPN-ID=1.

Moreover, it is assumed that all of the routers PR1-PR5 within the network NW1 shown in FIG. 1 have a multicast routing protocol activated in the global address space, so that they are capable of distributing multicast packets.

As for the tunneling technique, protocols such as the L2TP and IPsec can be used. In this embodiment, procedures for automatically establishing tunnels between virtual routers belonging to the same VPN by the edge routers PR1 and PR4 in case the L2TP is used as the tunneling technique will be described.

(1) In FIG. 5, the initiation packet transmitting means 201 of the edge router PR1 firstly generates tunnel initiation messages (hereinafter, referred to as initiation messages), which are control packets, referring to the VPN-ID—virtual router correspondence table 301 per VPN-ID set therein, and refers to the VPN-ID—multicast address correspondence table 302 to transmit the initiation messages having set the multicast addresses corresponding to the VPN-ID's as destination addresses through the packet transmitting means 101 to the network NW1.

A packet format of the initiation message is shown in FIG. 8, and field values of the initiation message corresponding to VPN-ID=1, for example, are shown in FIG. 9.

(2) The edge router PR4, when the initiation packet receiving means 204 receives the above-mentioned initiation message through the packet receiving means 102, uses the virtual link establishing means 203 to establish a tunnel to a SRC IP address, the IP address of the edge router PR1 in this case, in the initiation message.

At this time, since a "tunnel type" field value in the initiation message indicates "0", that means the L2TP tunnel, the edge router PR4 establishes the L2TP tunnel.

By exchanging L2TP protocol packets, the edge router PR4 obtains a tunnel ID and a session ID of the L2TP tunnel. In case of an L2TP tunnel, when the direction of reply from the edge router receiving the initiation message is named an upward direction, and the opposite direction is named a downward direction, tunnels in both directions are established simultaneously.

Therefore, an upward tunnel (PR4→PR1) and a downward tunnel (PR1→PR4), respectively, can have values of the tunnel ID and the session ID as shown in FIGS. 10A and 10B, for example.

Next, the virtual router VPN1-VR2 corresponding to the VPN-ID in the message generates a new virtual interface (see V1-VR2-VP1 in FIG. 1), and the correspondence between the virtual interface V1-VR2-VP1 and the connecting destination address (SRC IP of the initiation message) are entered into the virtual interface management table 303.

Also, correspondences between the generated virtual interface V1-VR2-VP1 and the upward tunnel's tunnel ID and session ID are entered into the VPN multiplexing table 305.

Moreover, a correspondence between the IP address of the edge router PR1 that is the transmitting source of the initiation message included in the IP header of the initiation message (IP address of PR1-PP6 in this case) and the IP address of the transmitting source virtual router VPN1-VR1 included in the SRC IP field of the initiation message is entered in the private address resolution table 304.

(3) Then, the edge router PR4 transmits a reply message through the established tunnel. The packet format of the reply message is the same as that of the initiation message shown in FIG. 8 and the field values of the reply message are as shown in FIG. 11.

(4) The edge router PR1 having received the above-mentioned reply message generates a new virtual interface V1-VR1-VP6 to the VPN1-VR1 corresponding to the VPN-ID within the reply message.

Thereafter, reply packet receiving means set the correspondences among the virtual router, the virtual interface, and the tunnel ID and the session ID within the reply message in a demultiplexing table as later described. The demultiplexing table is referred by the edge router PR1 having received the reply packet through the L2TP tunnel to determine which virtual interface of which virtual router should receive the packet according to the values of the session ID and the tunnel ID.

The above-mentioned procedures (1)-(4) are performed in the same way in case the initiation message is transmitted from the edge router PR4.

In the foregoing description referring to FIG. 5, the procedures between the two edge routers PR1 and PR4 have been described. However, there are actually a number of edge routers, so that if there are three edge routers as shown in FIG. 1, for example, the initiation messages multicast by the edge router PR1 in connection with the VPN1 are received by the edge routers PR4 and PR5 belonging to the multicast address group of the VPN1, and those in connection with the VPN2 are received by only the edge router PR4 belonging to the multicast address group of the VPN2.

When such operations are mutually performed by all of the edge routers within the network NW1, L2TP tunnels can be established in the full mesh between virtual routers included in the same VPN for a plurality of VPN's.

Figure 12:
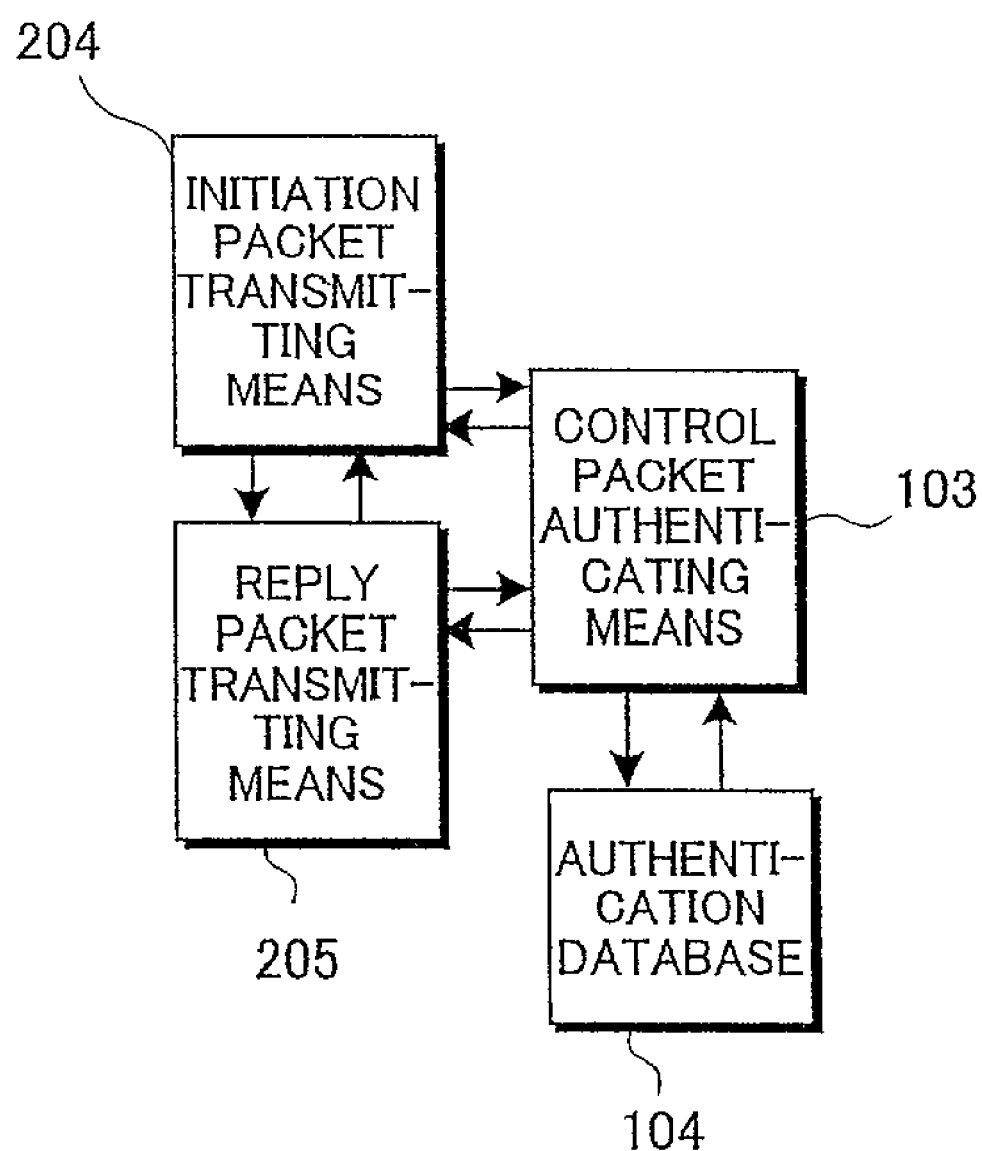
FIG. 12 is a block diagram showing a connection example of means which can be added to the arrangement of FIG. 5.

It is to be noted that FIG. 12 shows an example of connecting control packet authenticating means 103 and authentication database 104 to the initiation packet receiving means 204 and the reply packet receiving means 205 in case the control packet authenticating means 103 and the authentication database 104 are provided in the edge routers PR1 and PR4 shown in FIG. 5.

In this case, a password common to the edge routers managed by the provider is entered into the authentication database 104 of the edge routers.

As for the operation, the initiation packet receiving means 204 receives the initiation message from the edge router PR1 only when the control packet authenticating means 103 authenticate the password in the received initiation packet as the password entered into the authentication database 104.

Also, the reply packet receiving means 205 receives the reply packet only when the control packet authenticating means 103 authenticate the password in the received reply packet as the password entered into the authentication database 104.

In the VPN thus constructed by establishing the tunnels in the full mesh, the actual packet relaying process performed by the edge routers will be described hereinafter.

Communications within a provider network realizing the VPN can be separately considered in the following two stages:

(1) Backbone network communications
(2) Overlay network communications

The backbone network communications (1) are communications using global addresses realized by (physical) routers having the internet routing information within the provider network and by physical/logical links connecting the routers based on the Internet routing information managed by the provider network.

The overlay network communications (2) are communications using private addresses realized by virtual routers managing the user routing information and by tunnels connecting the virtual routers generated virtually on the backbone network based on the intranet routing information held by users. The overlay network communications are realized by encapsulating overlay network packets as communication packets of the backbone network to be transferred over the backbone network.

Figure 13:
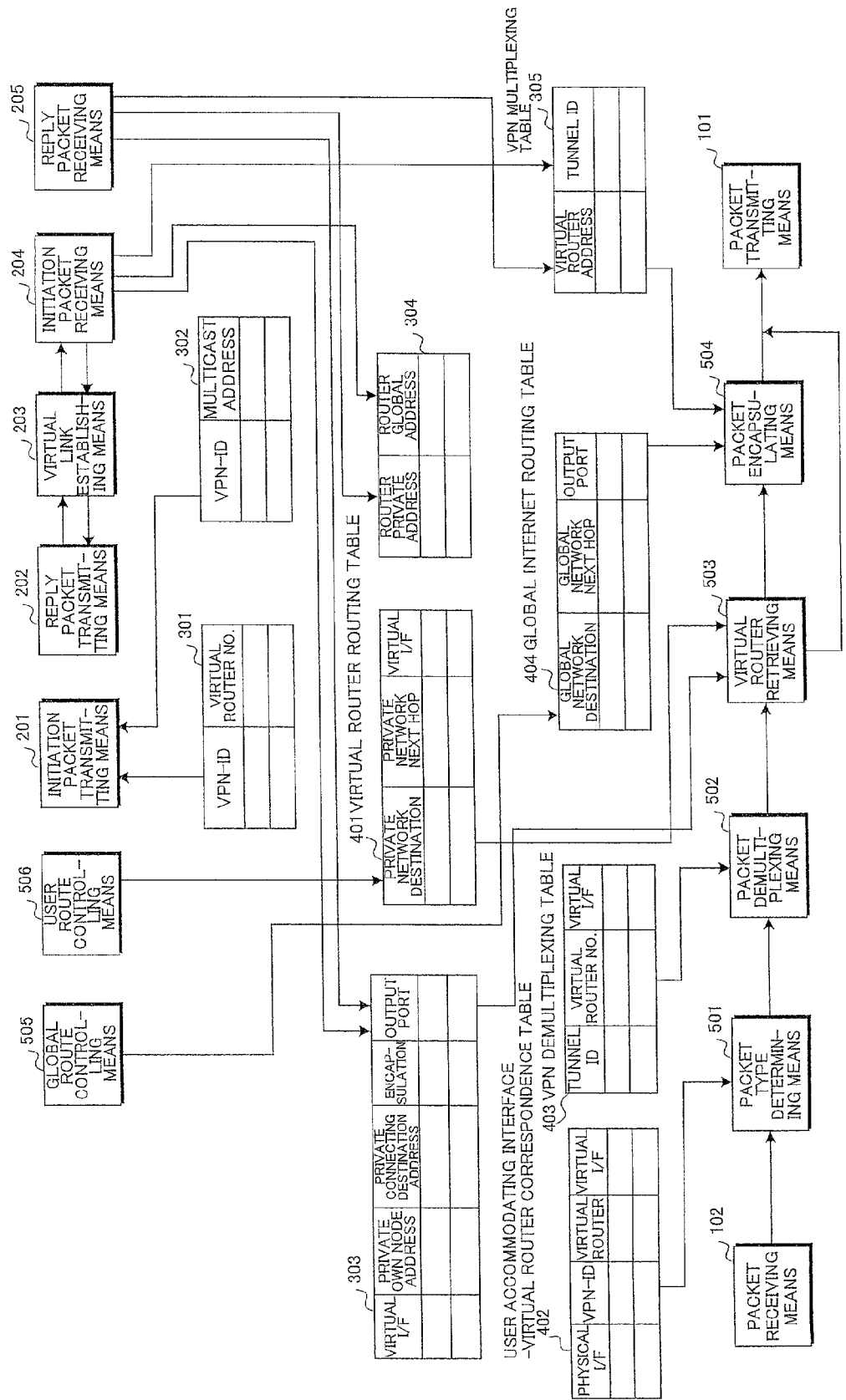
FIG. 13 is a block diagram showing a detailed function of an edge router shown in FIG. 1.
Figure 21:
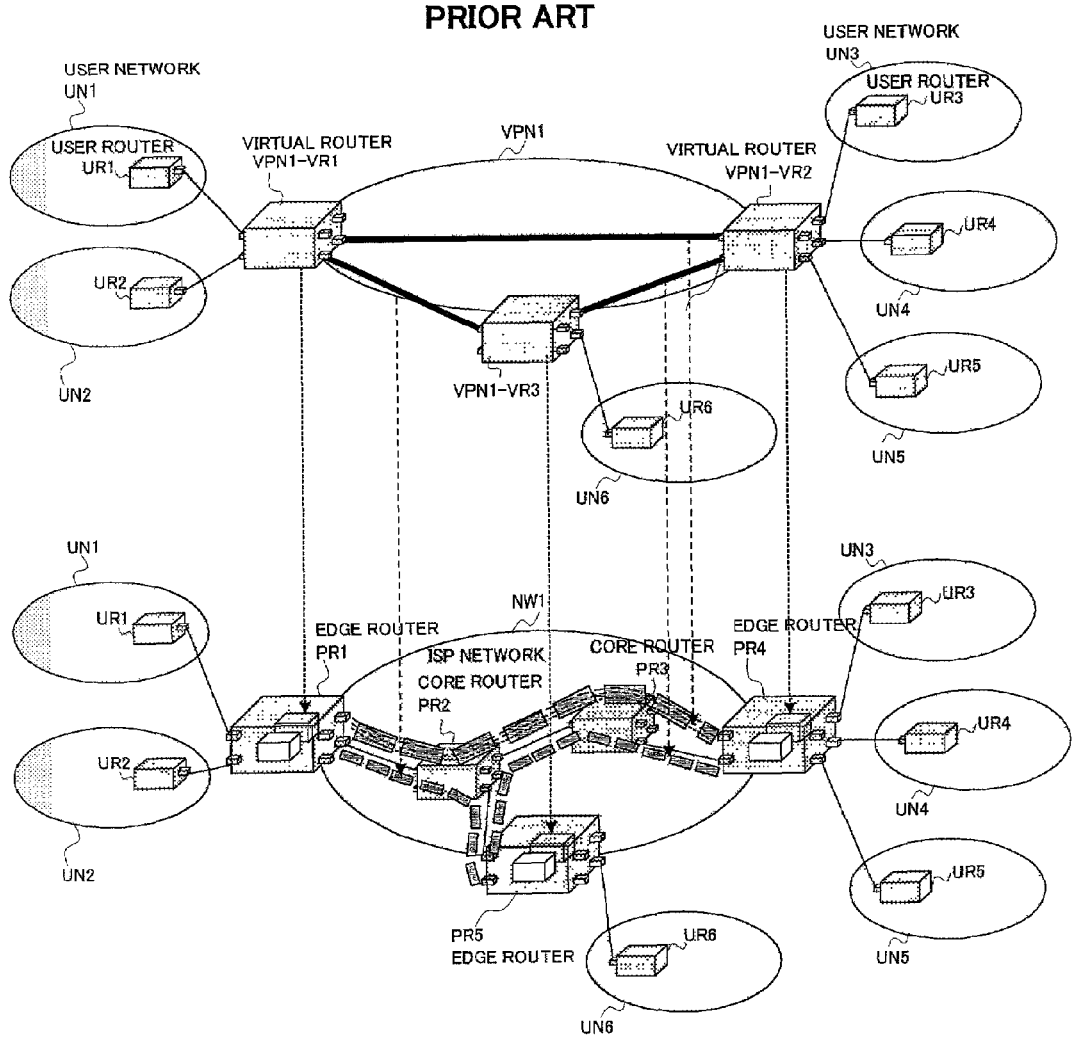
FIG. 21 is a diagram showing general overlays of VPN's on a global Internet.
Figure 22:
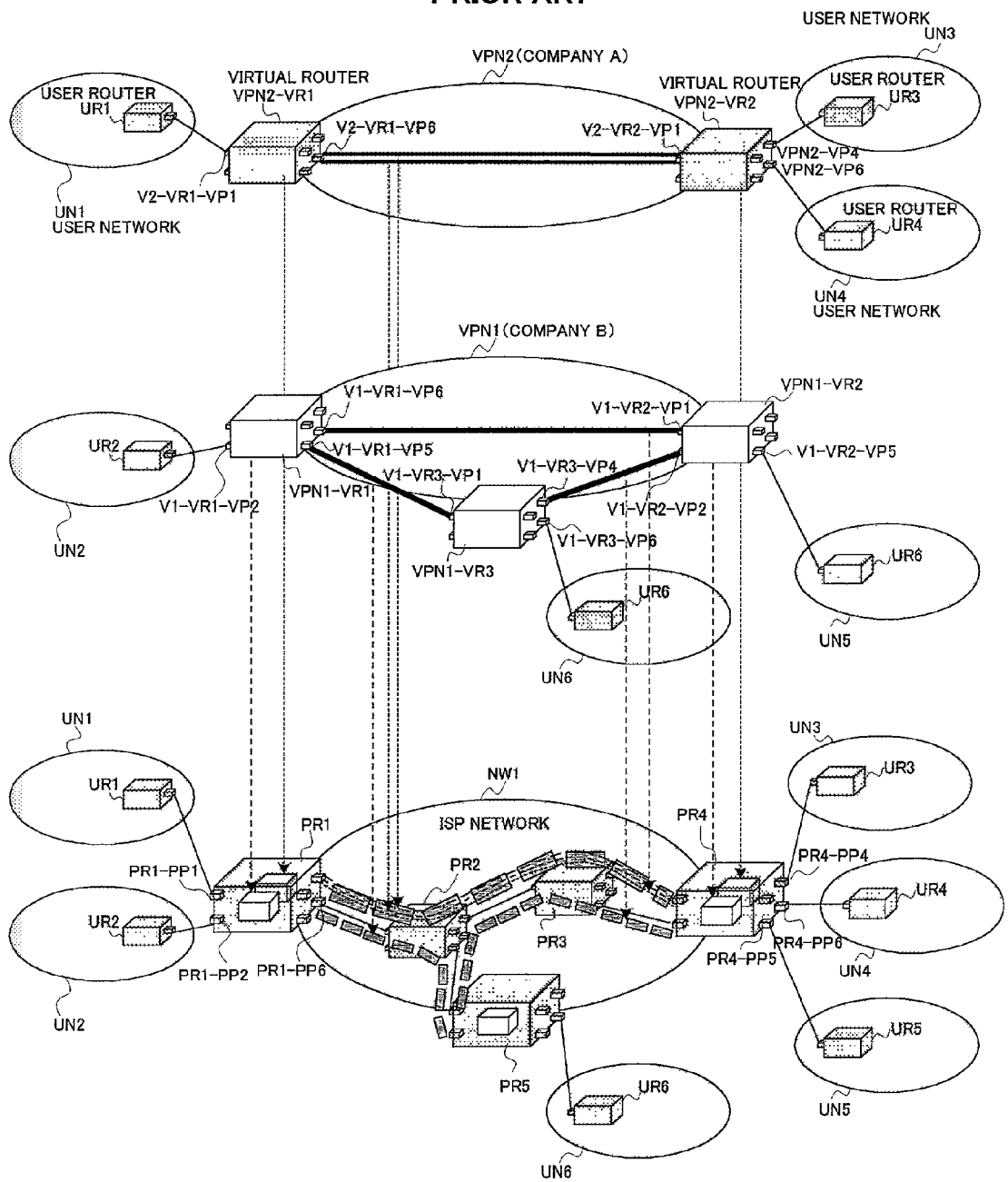
FIG. 22 is a network diagram showing a prior art VPN arrangement (1)

In order to describe the packet relaying processes performed by the edge routers realizing such backbone network communications (1) and overlay network communications (2), FIG. 13 shows a more detailed arrangement of the edge router common to the edge routers PR1 and PR4 shown in FIG. 5.

In addition to the arrangement of the edge router shown in FIG. 5, the embodiment of FIG. 13 is provided with packet type determining means 501, packet demultiplexing means 502, virtual router retrieving means 503, packet encapsulating means 504, global route controlling means 505, and user route controlling means 506 as packet relaying process means.

Moreover, a virtual routing table 401, a user accommodating interface—virtual router correspondence table 402, a demultiplexing table 403, and a global Internet routing table 404 are shown therein.

Hereinafter, the packet relaying process procedure of the edge router PR1 shown in FIG. 1 will be described assuming that the edge router PR1 has the arrangement shown in FIG. 13. It is to be noted that in the arrangement of FIG. 13, as in the case of FIG. 5, the control packet authenticating means 103 and the authentication database 104 may be provided as shown in FIG. 12, while the description is omitted hereinafter.

The global route controlling means 505 exchanges global address routing information with the global route controlling means 505 on the other router in the Internet to generate the global Internet routing table 404.

FIG. 14 shows an example of the global Internet routing table 404 of the edge router PR1. As shown in FIG. 1, an address [global1.0/24] is an IP address allocated to a network connecting the edge router PR and the core router PR2.

Therefore, in FIG. 14, the address [global1.0/24] is made to correspond to "next HOP"="direct" and "output port"=PR1-PP6.

Also, the user route controlling means 506 of the edge router PR1 exchanges user routing information shown by private addresses, with other user route controlling means 506 of edge routers PR4 and PR5 on the network NW1, or with the user route controlling means on the user routers UR1 and UR2 in the user networks UN1 and UN2 to generate the virtual router routing table 401 per virtual router.

FIG. 15 shows a virtual router routing table of the virtual router VPN1-VR1 as an example of the virtual router routing table 401 of the edge router PR1. For example, a route having a destination address [private1.6.0/24] is made to correspond to "next HOP"=[private1.100.3] and "output virtual I/F"=V1-VR1-VP5 as shown in FIG. 15.

This indicates that the route from the virtual router VPN1-VR1 shown in FIG. 1 to the user network UR6 having an address [private1.6.0/24] passes through the virtual router VPN1-VR3 having an address [private1.100.3] and that the output virtual I/F in this case is V1-VR1-VP5.

FIG. 16 shows an example of the user accommodating interface—virtual router correspondence table 402 of the edge router PR1 in this case.

For example, VPN-ID=2, virtual router=VPN2-VR1, and virtual interface V2-VR1-VP1 are made to correspond to the physical interface PR1-PP1.

Also, FIG. 17 shows an example of the virtual interface management table 303 of VPN1-VR1. In this case, e.g. its own address [private1.2.1], a connecting destination address [private1.20.11], encapsulation="NO", and the output port PR1-PP2 are made to correspond to the virtual interface V1-VR1-VP2. The encapsulation field indicates whether or not the encapsulation should be performed. In this case, the encapsulation is not performed since the user router UR2 of the user network UN2 is connected to the virtual interface V1-VR1-VP2.

In FIG. 17, e.g. the virtual interface V1-VR1-VP5 is connected to the virtual router VPN1-VR3 having an address [private1.100.3] through the L2TP tunnel, so that the encapsulation field denotes "YES".

Also, FIG. 18 shows an example of the private address resolution table 304. The private address resolution table is a table for obtaining, by the IP address of the destination virtual router, a global IP address of the edge router where the destination virtual router is located. When the virtual router transmits a packet to the next hop virtual router, it actually encapsulates the packet by a new packet header having a global address, so that a global IP address of the edge router is required for transmission to the edge router. In this case, e.g. a private address [private1.100.2] is made to correspond to a global address [global3.21].

Moreover, FIG. 19 shows an example of the VPN multiplexing table 305. The VPN multiplexing table is a table describing to which IP tunnel a packet should be transmitted, based on the address, upon transmission thereof to the destination virtual router. In this case, e.g. a transmitting tunnel ID=300 and a transmitting session ID=202 are made to correspond to a connecting destination virtual router address [private1.100.2].

It is now assumed that the host [private1.2.231] within the user network UN2 having an address [private2.0/24] shown in FIG. 1 accesses the server [private1.5.25] within the user network UN5 having an address [private1.5.0/241].

When the packet from the user network UN2 arrives at the port PR1-PP2 of the edge router PR1, the edge router PR1 refers to the user accommodating interface—virtual router correspondence table 402 (see FIG. 16) by the port number (PR1-PP2) having received the packet, identifies VPN-ID=1 and the virtual router VPN1-VR1 of the VPN to which the user network UN2 belongs, and passes the received packet to the virtual router VPN1-VR1.

The virtual router VPN1-VR1 having received the packet refers to the virtual router routing table 401 (see FIG. 15) including the routing information of the user networks belonging to VPN1, and obtains a next HOP address [private1.100.2] of the next HOP virtual router VPN1-VR2 and the virtual interface V1-VR1-VP6 that is the output virtual I/F made to correspond to the destination user network [private1.5.0/24].

The virtual router VPN1-VRL transmits the packet to the virtual interface V1-VR1-VP6 to which the next HOP virtual router VPN1-VR2 is connected. At this time, the edge router PR1 refers to the VPN multiplexing table 305 (see FIG. 19) to encapsulate the packet by the L2TP.

In this example, the entry of [private1.100.2] in the VPN multiplexing table 305 matches, so that the transmitting tunnel ID=300 and the transmitting session ID=202 are obtained.

Also, the private address resolution table 304 (see FIG. 18) is searched through to determine the global address [global3.2] of the next HOP edge router PR4 by the address [private1.100.2] of the next HOP virtual router VPN1-VR2.

The edge router PR1 encapsulates the packet received from the user network UN2 by the L2TP, and adds an IP header having a destination IP address of the previously obtained global address [global3.2], and then searches through the global Internet routing table 404 (see FIG. 14) to transmit the encapsulated packet to the interface PR1-PP6 shown in the output port field.

Conversely, the operations in case a reply is returned to the host [private1.2.23] from the server [private1.5.25] will be described below.

The edge router PR1, upon receiving the reply packet encapsulated by the L2TP from the physical interface PR1-PP6, refers to the VPN demultiplexing table 403 using the tunnel ID and the session ID within the encapsulated header as keys.

FIG. 20 shows an example of the VPN demultiplexing table 403 of the edge router PR1 in this case. This table is referred in order to determine which virtual interface of which virtual router should receive the packet based on the values of the session ID and the tunnel ID when the edge router PR1 receives the packet from the L2TP tunnel.

For example, as shown in FIG. 20, when a packet having the receiving tunnel ID=105 and the receiving session ID=200 is received, it is seen that the packet is received at the virtual interface V1-VR1-VP6 of the virtual router VPN1-VR1.

At this time, the edge router PR1 removes the encapsulated header to pass the received packet to the virtual router VPN1-VR1. The virtual router VPN1-VR1 having received the packet at the virtual interface V1-VR1-VP6 checks the destination address, which is the destination address within the user network, in the IP header of the received IP packet, having a private address after removal of the L2TP header, and searches through the virtual router routing table 401 (see FIG. 15) of the virtual router VPN1-VR1.

In this case, an entry with the destination address [private1.2.0/24] is hit, so that it is seen that the packet can be transmitted to the virtual interface V1-VR1-VP2.

Therefore, the edge router PR1 refers to the virtual interface management table 303 (see FIG. 17) to transmit the packet to the output port PR1-PP2 made to correspond to the virtual interface V1-VR1-VP2. At this time, since the encapsulation field of the table 303 indicates "NO", the encapsulation is not performed.

Figure 25:
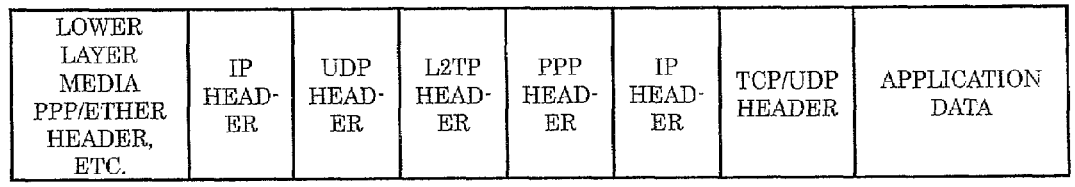
FIG. 25 is a diagram showing a packet format within a general L2TP tunnel.
Figure 26:
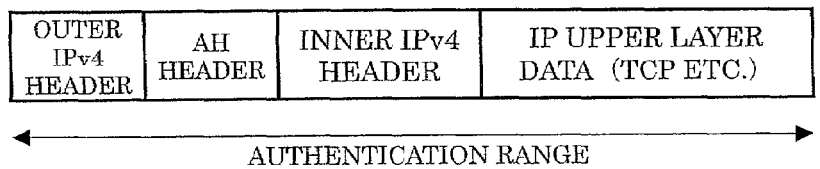
FIG. 26 is a diagram showing a packet format within a general IPsec tunnel using an AH header.
Figure 27:
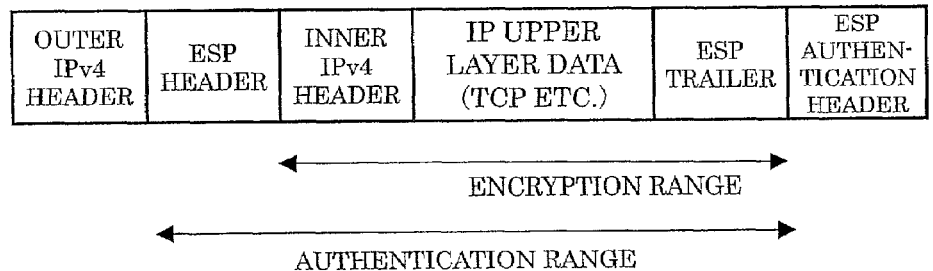
FIG. 27 is a diagram showing a packet format within a general IPsec tunnel using an ESP header.

It is to be noted that the present embodiment has dealt with the case where the L2TP tunneling is used as a tunneling technique. The format of the encapsulated packet transmitted through the L2TP tunnel in such a case is the same as that shown in FIG. 25.

However, since the tunneling techniques are not limited in the present invention, an IPsec tunnel or an MPLS tunnel can also be applied.

As described above, a virtual network construction method, a virtual network construction system, and a relaying apparatus according to the present invention are so arranged that control packets each having set a multicast address are multicast, and upon reception of the control packets by the relaying apparatuses belonging to the multicast address group, virtual links to the transmitting sources of the control packets are established by the received relaying apparatus and reply packets are returned through the virtual links, whereby the virtual links are established between all of the relaying apparatuses belonging to the multicast address group to establish the virtual network. Therefore, complicated VPN management becomes unnecessary and various tunneling techniques become available.

What we claim is:

1. A virtual private network (VPN) construction system for a public data communication network comprising:
    first relaying apparatuses, with one or more virtual routers each of which is associated with a VPN-ID and a multicast address in a table, generating and multicasting control packets each of which contains a source address of each virtual router and is transmitted for the multicast address as a destination address corresponding to the VPN-ID of each virtual router, and
    second relaying apparatuses, with one or more virtual routers each of which is associated with a VPN-ID and a multicast address in a table, accepting only the control packets of the multicast address corresponding to the VPN-ID of each virtual router of the second relaying apparatuses, establishing virtual links using the source address in the control packets with the first relaying apparatuses and returning reply packets to the first relaying apparatuses through the virtual links,
    whereby the virtual private network is constructed between the virtual routers that are specific to a same multicast address in the first and the second relaying apparatuses, with the virtual links established between all pairs of the virtual routers and with virtual interfaces receiving packets from outside the public data communication network.

2. The virtual private network construction system as claimed in claim 1 wherein the second relaying apparatuses establishing the unicast virtual links authenticate the control packets received.

3. The virtual private network construction system as claimed in claim 1 wherein the unicast virtual links comprise IP tunnels.

4. The virtual private network construction system as claimed in claim 1 wherein the unicast virtual links comprise MPLS tunnels.

5. A relaying apparatus, which terminates virtual private networks (VPNs) within a public data communication network comprising:
    virtual routers each of which is associated with a VPN-ID and a multicast address in a table,
    a packet unit generating and multicasting control packets each of which contains a source address of each virtual router and is transmitted for the multicast address as a destination address corresponding to the VPN-ID of each virtual router, and
    a link unit accepting only the control packets of the multicast address corresponding to the VPN-ID of each virtual router of one or more other relaying apparatuses establishing virtual links using the source address in the control packets with the one or more other relaying apparatuses which are transmitting sources of the control packets and returning reply packets to the one or more other relaying apparatuses through the virtual links,
    whereby the virtual private network is constructed between the virtual routers that are specific to a same multicast address, with the virtual links established between all pairs of the virtual routers, and with virtual interfaces receiving packets from outside the public data communication network.

6. The relaying apparatus as claimed in claim 5, further comprising means for authenticating the control packets received.

7. The relaying apparatus as claimed in claim 5, further comprising means for generating a routing table for each of a plurality of virtual networks logically independent of one another, and means for performing a packet relay of each virtual network based on the routing table.

8. The relaying apparatus as claimed in claim 5 wherein the unicast virtual links comprise IP tunnels.

9. The relaying apparatus as claimed in claim 5 wherein the unicast virtual links comprise MPLS tunnels.

* * * * *

UNITED STATES PATENT AND TRADEMARK OFFICE
CERTIFICATE OF CORRECTION

PATENT NO.       : 7,660,324 B2                                         Page 1 of 1
APPLICATION NO.  : 09/988958
DATED            : February 9, 2010
INVENTOR(S)      : Oguchi et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 842 days.

Signed and Sealed this

Twenty-sixth Day of October, 2010

David J. Kappos
*Director of the United States Patent and Trademark Office*